United States Patent
Kundu et al.

(10) Patent No.: US 12,526,302 B1
(45) Date of Patent: Jan. 13, 2026

(54) SIGNED BI-DIRECTIONAL ANOMALY NEIGHBORHOOD ALGORITHM

(71) Applicant: INTUIT INC., Mountain View, CA (US)

(72) Inventors: Vivek Kundu, Bengaluru (IN); Sourav Prosad, Bengaluru (IN); Sutanoy Dasgupta, Bengaluru (IN); Arkadeep Banerjee, Bengaluru (IN); Indra Sena Reddy Bommareddy, Bengaluru (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/223,465

(22) Filed: May 30, 2025

(51) Int. Cl.
*H04L 9/40* (2022.01)

(52) U.S. Cl.
CPC ...... *H04L 63/1425* (2013.01); *H04L 63/1441* (2013.01); *H04L 2463/121* (2013.01)

(58) Field of Classification Search
CPC ............. H04L 63/1425; H04L 63/1441; H04L 2463/121
See application file for complete search history.

(56) References Cited

U.S. PATENT DOCUMENTS

| | | | | |
|---|---|---|---|---|
| 11,089,108 | B2* | 8/2021 | Shah | G06Q 10/04 |
| 12,034,747 | B2* | 7/2024 | Raghavendra | G06N 3/0442 |
| 12,393,882 | B2* | 8/2025 | Yamaguchi | G06N 20/10 |
| 2014/0006330 | A1* | 1/2014 | Biem | G06F 21/552 706/46 |
| 2020/0134075 | A1* | 4/2020 | Park | G01D 9/00 |
| 2021/0037031 | A1* | 2/2021 | Kulkarni | G06F 17/18 |
| 2022/0366316 | A1* | 11/2022 | Sharma | H04L 63/1425 |
| 2022/0414662 | A1* | 12/2022 | Cao | G06Q 20/4016 |
| 2024/0135149 | A1* | 4/2024 | Kelcey | G06N 3/08 |
| 2024/0406192 | A1* | 12/2024 | Arnon | H04L 63/1466 |
| 2025/0005145 | A1* | 1/2025 | Kulathumani | G06F 21/554 |

OTHER PUBLICATIONS

Hedge, Chetana, "Anomaly Detection in Time Series Data using Data-Centric AI," 2022 IEEE International Conference on Electronics, Computing and Communication Technologies (CONECCT) Year: 2022 | Conference Paper | Publisher: IEEE.*

Hossain et al., "Anomaly Detection in Industrial Machinery Using Machine Learning and Deep Learning Techniques with Vibration Data for Predictive Maintenance," 2025 2nd International Conference on Advanced Innovations in Smart Cities (ICAISC) Year: 2025 | Conference Paper | Publisher: IEEE.*

* cited by examiner

*Primary Examiner* — Roderick Tolentino
(74) *Attorney, Agent, or Firm* — Patterson + Sheridan, LLP (57) ABSTRACT

Aspects of the present disclosure relate to systems and protocols for detecting anomalies in time series data. Embodiments include comparing the value for a data item to values for a neighborhood of data items from before the data item in the time series and values for a neighborhood of data items from after the data item in the time series. Based on the comparisons, an anomaly may be detected using an anomaly detection algorithm. Furthermore, the anomaly detection protocol may be integrated into computing systems to detect anomalous activity and performance metrics. Based on the detected anomalies, remedial actions may be performed with respect to the computing systems.

20 Claims, 8 Drawing Sheets

Require: Time series $T = \{t_1, t_2, ..., t_n\}$, neighborhoods size $l$ for left and $r$ for right neighborhood ($l, r \in \mathbb{R}$)
Ensure: Anomaly labels $A$ and Insight Scores $\mathcal{I.S.}$
1: if $len(T) < 4$ then
2:    return Anomaly labels $A$ and Insight Scores $\mathcal{I.S.}$ (both empty)
3: end if
4: for each index point $i$ in $T$ do
5:    if $i < l$ or $i + r \geq length(T)$ then
6:       Identify combined neighborhood $n_i$ as the $min(l + r, len(T))$ points around $i$
7:       Calculate $A_i$ as:

$$A_i = [\mathbb{I}(t_i > q_3(n_i) + 1.5 \cdot IQR(n_i)) - \mathbb{I}(t_i < q_1(n_i) - 1.5 \cdot IQR(n_i))] \text{ where, } t_i \in T$$

8:       if $A_i \neq 0$ then
9:          Label point $i$ as an anomaly
10:       end if
11:    else
12:       Identify left neighborhood $n_i^l$ as the previous $l$ points of $t_i$
13:       Identify right neighborhood $n_i^r$ as the next $r$ points of $t_i$
14:       Calculate $IQR(n_i^l) = q_3(n_i^l) - q_1(n_i^l)$
15:       Calculate $IQR(n_i^r) = q_3(n_i^r) - q_1(n_i^r)$
16:       Calculate $A_i$ as:

$$A_i = [\mathbb{I}(t_i > q_3(n_i^l) + 1.5 \cdot IQR(n_i^l)) - \mathbb{I}(t_i < q_1(n_i^l) - 1.5 \cdot IQR(n_i^l))]$$
$$\times [\mathbb{I}(t_i > q_3(n_i^r) + 1.5 \cdot IQR(n_i^r)) - \mathbb{I}(t_i < q_1(n_i^r) - 1.5 \cdot IQR(n_i^r))]$$
$$\text{where, } t_i \in T$$

17:       if $A_i = 1$ then
18:          Label point $i$ as an anomaly
19:       end if
20:       Calculate $n_i = n_i^l + n_i^r$
21:    end if
22:    Calculate $\mu(n_i)$ and $\sigma(n_i)$ for $n_i$
23:    Assign Insight Score $\mathcal{I.S.}_i$ as:

$$\mathcal{I.S.}_i = \tanh\left(\frac{t_i - \mu(n_i)}{\sigma(n_i)}\right)$$

24: end for
25: return Anomaly labels $A$ and Insight Scores $\mathcal{I.S.}$

FIG. 7

SIGNED BI-DIRECTIONAL ANOMALY NEIGHBORHOOD ALGORITHM

INTRODUCTION

Aspects of the present disclosure relate to techniques and systems for implementing anomaly detection protocols. In particular, techniques disclosed herein provide for an accurate efficient anomaly detection protocol that minimizes the amount of false positives and false negatives in detecting anomalies.

BACKGROUND

An ever-growing number of people, businesses, and organizations around the world rely on computing-based systems such as software applications. For example, a multitude of individuals may interact with a software application over a communications network in order to perform tasks using the software application.

Ensuring that such computing-based systems remain operational often involves detecting anomalies associated with the systems. For example, in a computing system that utilizes generative machine learning technologies, anomalies in outputs generated by a model may indicate that the model is hallucinating and needs to be retrained. As another example, anomalies in network packets may be a sign of a malicious attack on the network to disable the network, obtain sensitive data, and/or the like. In a further example, anomalies in network transmissions or other computing processes (e.g., spikes in time required to process packets or spikes in resource utilization) may indicate problems with the network/computing system. Existing techniques for detecting and addressing such anomalies often fail to accurately detect anomalies. For example, existing anomaly detections are prone to false negatives and false positives.

Thus, there is a need in the art for improved techniques of automated anomaly detection.

BRIEF SUMMARY

Certain embodiments provide a system. The system generally includes: one or more processors; and a memory comprising instructions that, when executed by the one or more processors, cause the system to: receive time series data comprising a set of data items, each data item comprising a respective distance in an embedding space between an embedding representation of a respective input to a generative machine learning model and an embedding representation of a respective output generated by the generative machine learning model based on the respective input, wherein a given data item of the time series data has a first neighborhood of data items from earlier in the time series data than the given data item and a second neighborhood of data items from later in the time series data than the given data item; determine a first score for the given data item based on comparing a value for the given data item to a third quartile value and a first quartile value for the first neighborhood; determine a second score for the given data item based on comparing a value for the given data item to a third quartile value and a first quartile value for the second neighborhood; detect that the given data item is anomalous based on a third score that is determined based on the first score and the second score; and retrain the generative machine learning model based on detecting that the given data item is anomalous.

Some embodiments provide an anomaly detection protocol. The protocol generally includes: receiving time series data comprising a set of data items, wherein a given data item of the time series data has a first neighborhood of data items from earlier in the time series data than the given data item and a second neighborhood of data items from later in the time series data than the given data item; determining a first score for the given data item based on comparing a value for the given data item to a third quartile value and a first quartile value for the first neighborhood; determining a second score for the given data item based on comparing a value for the given data item to a third quartile value and a first quartile value for the second neighborhood; and detecting that the given data item is anomalous based on a third score that is determined based on the first score and the second score.

Other embodiments provide processing systems configured to perform the aforementioned protocol as well as those described herein; non-transitory, computer-readable media comprising instructions that, when executed by one or more processors of a processing system, cause the processing system to perform the aforementioned protocol as well as those described herein; a computer program product embodied on a computer readable storage medium comprising code for performing the aforementioned method as well as those further described herein; and a processing system comprising means for performing the aforementioned protocol as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 7 depicts example computing code for implementing an anomaly detection algorithm.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for detecting anomalies in time series data and addressing the anomalies.

According to certain embodiments, a unique signed bi-directional algorithm is used to detect anomalies in time series data. The algorithm generally involves comparing the value for a given data item to values for a temporal neighborhood comprising data items from earlier in time than the given data item. The value for the given data item is also compared to a temporal neighborhood that includes data items from later in time than the given data item. The comparisons may involve comparing the value for the given data item to both the third quartile and the first quartile values for each of the temporal neighborhoods. The results of the comparisons may be used to determine whether the given data item is anomalous. Also, the anomaly detection process may be repeated for other data items to detect other anomalies in the time series data.

By taking into account the temporal context from both before a data item and after the data item, embodiments disclosed herein are better able to adapt to local fluctuations and trends in data than existing techniques. As a result, the dual-neighbor anomaly detection approach disclosed herein may allow for more accurately detecting anomalous data compared to prior art techniques such as machine learning models, expanding window algorithms, and isolation forest algorithms. For example, the anomaly detection protocols disclosed herein demonstrate a 40 percent increase in precision and a 125 percent increase in recall compared to the expanding window algorithms. Also, the anomaly detection protocols disclosed herein demonstrate a 75 percent increase in precision and a 50 percent increase in recall compared to an isolation forest algorithm. Furthermore, in contrast to techniques disclosed in the art, anomaly detection protocols disclosed herein allow for detecting anomalies in sparse time series data sets (e.g., data sets containing as few as four data items) and time series data sets that are accumulated over a relatively long period of time (e.g., monthly).

The anomaly detection protocols disclosed herein particularly excel in detecting and addressing anomalies in computing-based systems. For example, techniques disclosed herein may be used to detect hallucinations in outputs of generative machine learning models. In some embodiments, hallucinations are detected by monitoring the distance in an embedding space between the inputs provided by a generative model and outputs generated based on the inputs over time. Other embodiments provide for detecting anomalous machine learning outputs based on the distance between the outputs and a ground truth output for the use case in an embedding space. Anomalous shifts in the distance may indicate model hallucination or collapse. Thus, if an anomaly is detected, the generative machine learning model may be retrained, fine-tuned, and/or the like.

In another example, techniques described herein may be used to detect and address anomalies in network activity. Anomalous network activity may indicate malicious activities such as distributed denial-of-service (DDoS) attacks or attempts by hostile parties to gain access to sensitive information. For example, anomalies in the features of packets received/sent over a network (e.g., a spike in the number of unique Media Access Control (MAC) addresses associated with packets) may indicate a DDoS attack. If such anomalies are detected, the suspicious packets may be blocked and the sender of the suspicious packets may be blocked from sending further packets over the network.

In a further example, anomaly detection protocols disclosed herein may be used to maintain the health of computing devices and systems. In a computing device or system (e.g., a computer and/or the network over which the computer communicates), anomalous spikes in resource utilization or latency may indicate problems (e.g., the network or processor capacity may be exceeded). Based on these detected anomalies, one or more remedial actions may be performed, such as terminating processes, allocating additional processor resources to a process, repairing and/or updating software/hardware components, and/or the like.

The anomaly detection protocols described herein may also be used for detecting anomalies in other types of data. For example, anomalies in sales data or logistical data may indicate supply chain and/or salesforce problems that should be addressed. Techniques disclosed herein increase the speed and reliability with which these anomalies are identified as compared to prior automated anomaly detection techniques (e.g., existing machine learning models, expanding window algorithms, isolation forest algorithms, and the like), thereby allowing businesses to better address problems that arise.

Example Computing Components Related to Anomaly Detection

Figure 1:
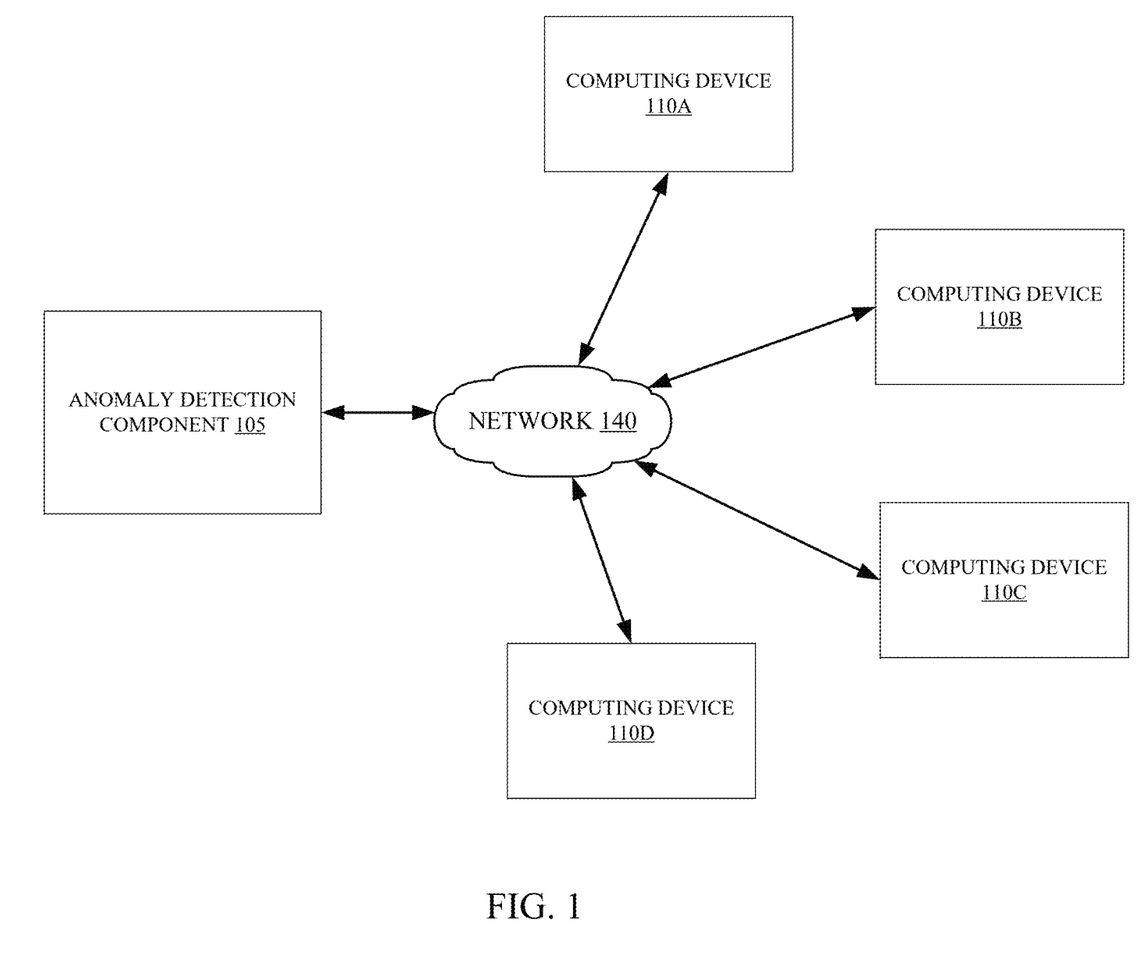
FIG. 1 depicts an example of computing components related to anomaly detection.

FIG. 1 depicts an example of computing components related to anomaly detection.

An anomaly detection component 105 may comprise one or more processors configured to use an anomaly detection algorithm to detect anomalies in tine series data. As discussed in further detail below with respect to FIG. 3, the anomaly detection algorithm may involve comparing a given data item in the time series data to a first neighborhood comprising data items from earlier in the time series data. The anomaly detection algorithm may also involve comparing the given data item in the time series data to a second neighborhood comprising data items from later in the time series data. Based on the comparisons, the anomaly detection algorithm may determine whether the given data item is anomalous.

The time series data may generally be any type of time series data from any source. As shown in FIG. 1, the data may be received from a network 140 that is communicatively coupled to the anomaly detection component 105 and one or more computing devices 110. In an example, the anomaly detection component 105 may be used to detect anomalies in machine learning model systems. Users of the machine learning model system may submit inputs (e.g., including input prompts) to the system, and a generative machine learning model connected to the system via network 140 may generate outputs based on the inputs provided by the users. The time series data transmitted to the anomaly detection component 105 via the network 140 may thus comprise inputs and corresponding outputs generated based on the inputs. Based on detected anomalies, the generative machine learning model may be retrained.

As another example, the time series data may comprise data associated with the network 140. More specifically, the time series data may include features of packets transmitted over the network 140. The anomaly detection component 105 may be used to detect anomalies associated with the packets. For example, if the number of packets having a certain feature is anomalous, the anomaly detection component 105 may be used to detect this anomaly. As another example, if a feature of an individual packet is anomalous, the anomaly detection component 105 may be used to detect the anomaly. Based on detected anomalies, one or more packets may be blocked, one or more senders may be blocked, and or the like.

In a further example, the time series data may comprise performance data (e.g., data related to the performance of network 140 or a computing device 110). For example, if the network 140 experiences heavy latency, the latency may be anomalous (e.g., the latency may be heavier than expected given the amount of traffic on the network 140). Anomalies in latency may indicate problems with the network 140. Thus, if the anomaly detection component 105 detects an anomalous amount of latency in the network, one or more remedial actions may be performed, such as performing maintenance on the hardware and/or software used to implement the network 140, performing a malware scan on the network 140, and/or the like. Similar remedial actions may be taken if an anomaly is detected in the performance of a computing device 110. For example, if computing device 110B is using an anomalously high amount of processor resources, this may indicate a problem with computing device 110B.

Examples of the network(s) 140 may include, without limitation, a wide area network (WAN), a local area network (LAN), and/or a cellular network. In one example, network 140 is the Internet.

Other embodiments provide that the time series data comprises financial and/or logistical data. For example, a given data item may represent the amount of sales of a particular product at a particular time. Thus, techniques disclosed herein may be used to address supply chain and other sales-related problems through improved automated analysis of time-series data for anomaly detection.

Figure 2:
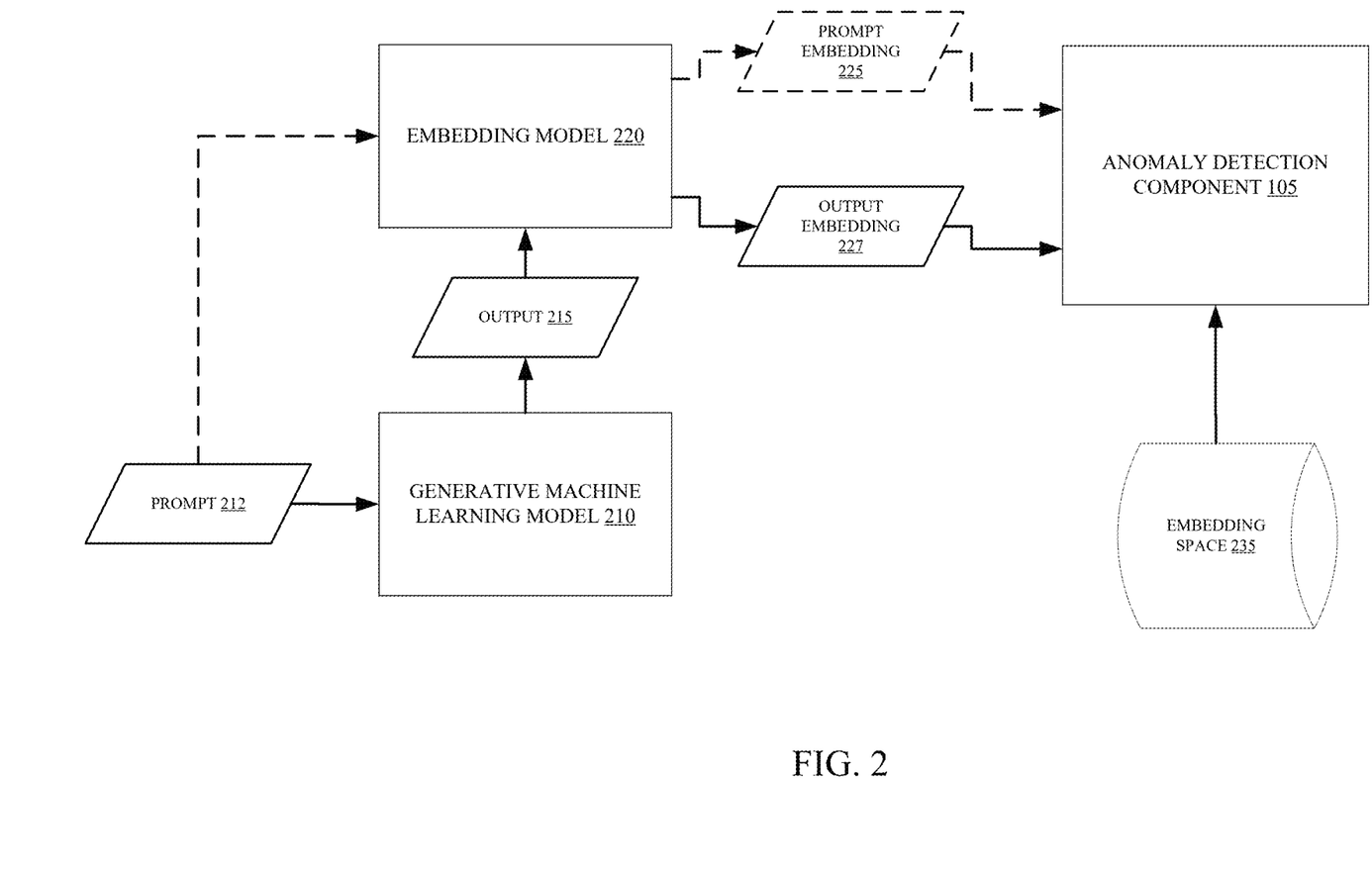
FIG. 2 depicts an additional example of computing components related to anomaly detection.

FIG. 2 depicts an additional example of computing components related to anomaly detection. In particular, FIG. 2 depicts an embodiment where the anomaly detection component 105 of FIG. 1 is used to detect anomalies associated with a machine learning model system.

A generative machine learning model 210 may be any suitable type of generative machine learning model capable of generating content, such as a generative adversarial network, a variational autoencoder, an autoregressive model, a transformer model, a language processing machine learning model, a recurrent neural network, or the like.

The generative machine learning model 210 may be provided with a prompt 212 and may generate an output 215 based on the prompt 212. For example, the prompt 212 may include a natural language query such as a request or a question, and the output 215 may comprise a response to the query such as an answer to a question.

The output 215 may be provided to an embedding model 220. In some embodiments, the prompt 212 may also be provided to the embedding model 220. An embedding generally refers to a vector representation of an entity that represents the entity as a vector in n-dimensional space such that similar entities are represented by vectors that are close to one another in the n-dimensional space. The embedding model 220 may comprise a neural network or other type of machine learning model that learns a representation (embedding) for an entity through a training process that trains the neural network based on a data set, such as a plurality of features of a plurality of entities. In one example, the embedding model 220 comprises a Bidirectional Encoder Representations from Transformer (BERT) model, which involves the use of masked language modeling to determine embeddings. In a particular example, the embedding model 220 comprises a Sentence-BERT model. In other embodiments, the embedding model 220 may involve embedding techniques such as Word2Vec and GloVe embeddings. These are included as examples, and other techniques for generating vector representations of entities (such as embedding representations) are possible.

The embedding model 220 may generate an output embedding 227, an embedding representation of the output 215. In embodiments where the prompt 212 is provided to the embedding model 220, a prompt embedding 225 may also be generated.

A semantic similarity algorithm such as cosine similarity or edit distance may be used to determine the degree of similarity between entities represented by embeddings. For example, if two outputs are highly similar, the embedding representations of the outputs will be closer together in an embedding space 235 than two outputs that are not as similar. Thus, the distance between embedding representations of two entities in the embedding space 235 may be used as an indication of the semantic similarity between the entities.

According to some embodiments, the output embedding 227 may be compared to other embeddings in the embedding space 235 (e.g., using a semantic similarity algorithm). For example, the prompt 212 and output 215 may correspond to a particular use case (e.g., the particular use case may be to generate an answer to a particular type of question). The output embedding 227 may be compared to an embedding of a ground truth output for that use case (or embeddings of multiple ground truth outputs for the use case). The distance between the output embedding 227 and the ground truth embedding may be used by the anomaly detection component 105 to determine whether the output 215 is anomalous. Alternatively, the distance between the output embedding 227 and the prompt embedding 225 may be used to determine whether the output 215 is anomalous.

For example, as outputs are generated by the generative machine learning model 210, embedding representations of the outputs may be created an compared to embedding representations within the embedding space 235, such as embeddings of one or more ground truth responses for the use cases that correspond to the outputs. The distance between the generated outputs and the ground truth output(s) in the embedding space 235 may be recorded. In some embodiments, the average distance between a given output and each of the ground truth embeddings may be recorded, while in other embodiments the smallest or largest distance between the given output and a ground truth embedding may be recorded. Other embodiments provide that the recorded distance for each output is the distance between the embedding of the output and the embedding of the corresponding prompt.

The recorded distance for the given output may be compared to recorded distances for other outputs using an anomaly detection algorithm as described in further detail below with respect to FIG. 3. For example, the comparison may involve comparing the distance for the given output to the third quartile and first quartile of distances for a neighborhood of distances associated with outputs generated before the given output. The comparison may also involve comparing the distance for the given output to the third quartile and first quartile of distances for a neighborhood of distances associated with outputs generated after the given output.

Anomalies in the recorded distances for outputs may indicate problems with the generative machine learning model 210. For example, distances between outputs and ground truth outputs may increase and/or decrease over time as new ground truth outputs are created and old ground truth outputs are replaced. Similarly, the distance between prompts and outputs may increase and/or decrease over time with new trends in prompts and user activity. Thus steady trends in the distances are generally not indicative of problems with a generative model. However, abrupt and anomalous changes may be indicative of a model hallucination or a model breakdown. If such anomalous activity is detected, the generative machine learning model 210 may be retrained, fine-tuned, and/or the like. Also, an anomalous output may be regenerated (e.g., by the retrained model).

Alternate embodiments provide that the anomaly detection component 105 is used to detect anomalies in other types of computing systems. For example, as mentioned above with respect to FIG. 1, anomaly detection component 105 may be used to detect anomalies associated with network traffic. In an example, the time series data analyzed by anomaly detection component 105 may include the number of network packets sent/received with respect to time. Anomalous spikes in the number of packets may indicate distributed denial-of-service (DDoS) attacks, malware attacks, attempts to gain access to sensitive information, and/or the like. In another example, features of the packets may be included in the analyzed time series data. For example, anomalous spikes in the number of unique MAC addresses in the packets may indicate malicious activity. Or, a subset of digits in the Media Access Control (MAC) addresses may be analyzed instead of the whole MAC address, and anomalous spikes in the number of unique values for the subset of the MAC addresses may be used to identify the anomalies. Other values of a network packet may be analyzed as well, such as the source internet protocol (IP) address or any other values in the header or payload may be similarly analyzed. Anomalous spikes in unique values may indicate malicious activity. If malicious activity is detected, one or more remedial actions may be taken. For example, one or more malicious packets may be dropped, one or more malicious senders may be blocked from sending and receiving further packets, other automated systems for detecting and blocking malicious activity may be activated (e.g., machine learning models trained to detect anomalous packets by generating an output indicating whether a packet is malicious based on being provided with an input comprising features of a packet), and/or the like. By using the anomaly detection component 105 to screen for malicious activity and only activating other, more resource intensive, automated systems when malicious activity is detected, embodiments disclosed herein may allow for saving an extensive amount of processor resources compared to running a more resource intensive detection system perpetually.

As another example, the anomaly detection component 105 may be used to detect anomalies in computing system performance. For example, the amount of computing resources (e.g., memory, processor capacity, network bandwidth, and/or the like) used by a computing system (e.g., one or more computing devices, a network, a software application, and/or the like) when performing tasks may increase and decrease over time as a function of traffic as well as the complexity and number of tasks that the computing system performs. However, anomalous spikes in the amount of computing resources used may indicate performance issues. As an example, if a computing device takes an anomalously long amount of time or requires an anomalously high amount of resources to perform a task, this may indicate a problem with the computing device (e.g., the device may be infected with malware, the device may need an upgrade or update, the device may lack the memory or computational power to perform the task, and/or the like). In another example, if a network experiences an anomalous spike in latency, this may indicate that the capacity of the network has been exceeded or that there is a problem with a server that implements the network. Based on detected performance anomalies, one or more remedial actions may be performed such as scanning a device for malware, updating a device/server, allocating additional processor resources for an application, terminating processes that are responsible for latency, retraining a machine learning model, deleting/detecting malware and/or unnecessary files, providing an indication of the problem to a user, and/or the like.

Figure 3:
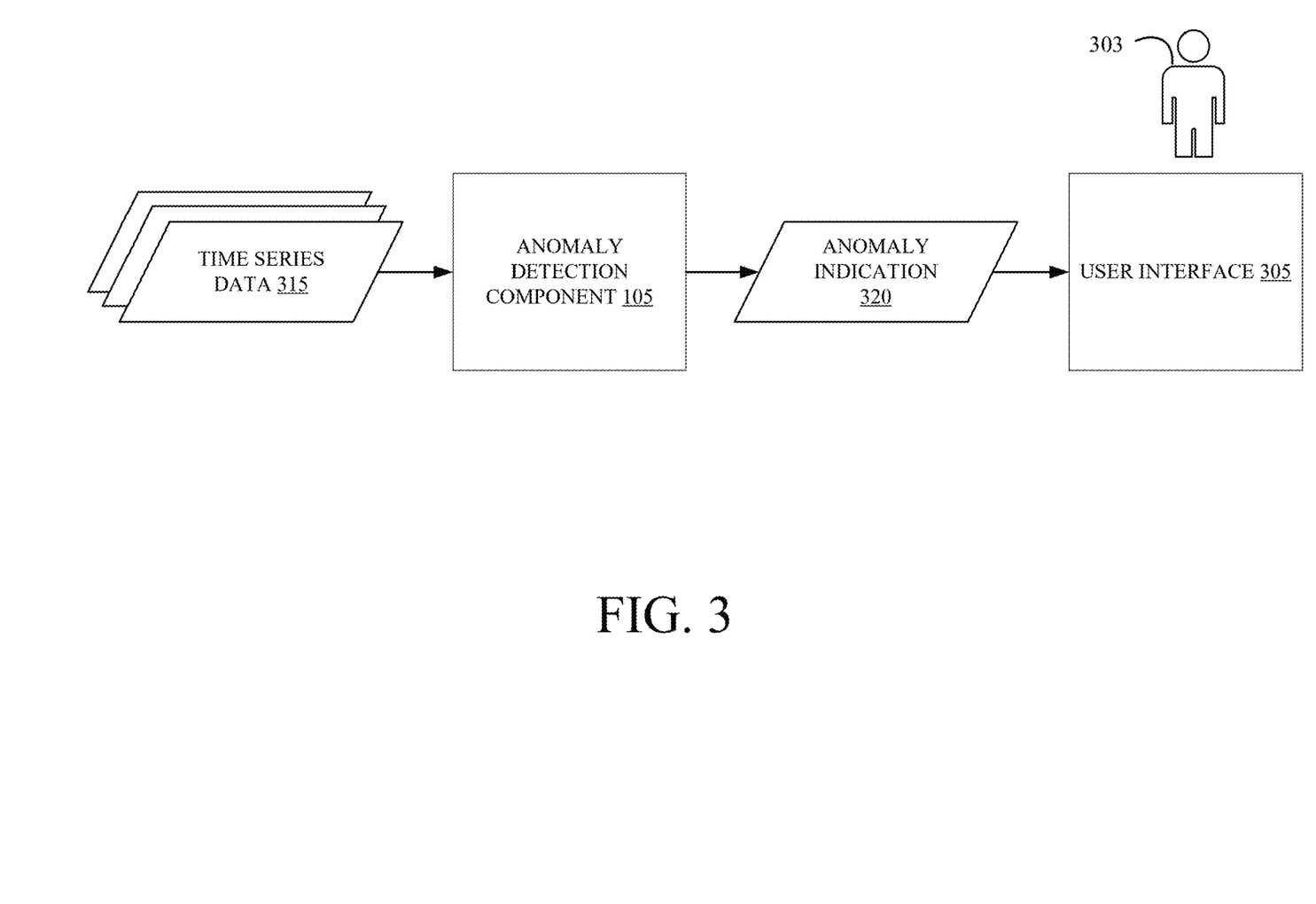
FIG. 3 depicts an additional example of computing components related to anomaly detection.

FIG. 3 depicts an additional example of computing components related to anomaly detection.

Time series data 315 may be provided as input to the anomaly detection component 105. The time series data 315 may comprise any form of time series data. For example, the time series data 315 may comprise values for a parameter with respect to time. In a particular example, the time series data comprises distances in an embedding space between outputs generated by a machine learning model and other entities. The distance for an output generated first in time relative to other outputs may be the first item in the time series data, the distance for an output generated second in time relative to other outputs may be the second item in the time series data, and so on. In another example, the time series data 315 may include values for a performance metric for a computing system (e.g., processing time, resource consumption) with respect to time. Another example provides that the time series data comprises network activity data with respect to time (e.g., the number of packets sent/received over a network with respect to time).

The anomaly detection component 105 may comprise one or more computing components configured to implement an anomaly detection algorithm. In some embodiments, the anomaly detection algorithm comprises:

$$[I(t_i>q_3(n_L)+k*IQR(n_L))-I(t_i<q_1(n_L)-k*IQR(n_L))]*[I(t_i>q_3(n_R)+k*IQR(n_R))-I(t_i<q_1(n_R)-k*IQR(n_R))],$$ where:

I( ) is an indicator function that returns a value of '1' if the conditional operation is true, and returns a value of '0' if the conditional operation is false;

$t_i$ is the value for the data item in time series dataset i that is being evaluated. If $t_i$ is anomalous, the anomaly detection algorithm may detect the anomaly;

$n_L$ is the neighborhood to the left of $t_i$ in the time series dataset i. In other words, $n_L$ comprises a set of data items that occur earlier in the time series data than $t_i$;

$n_R$ is the neighborhood to the right of $t_i$ in the time series dataset i. In other words, $n_R$ comprises a set of data items that occur later in the time series data than $t_i$;

$q_3$ is the third quartile value for a neighborhood. For example, $q_3(n_L)$ may be approximately the third quartile value for the left neighborhood;

$q_1$ is the first quartile value for a neighborhood. For example, $q_1(n_L)$ may be approximately the first quartile value for the left neighborhood;

IQR is the inner quartile range for a neighborhood. In other words, IQR represents the difference between the third quartile value and the first quartile value for the neighborhood. For example, $IQR(n_R)$ may be approximately the first quartile value for the right neighborhood;

\* is a multiplication operator; and k is a tunable parameter comprising a numerical value. In some embodiments, the value for the parameter k is learned through a supervised learning process involving a time series dataset with known anomalous data items (also referred to as the training data set). The value of k that results in the highest accuracy in detecting anomalies for the training data set may be chosen. Thus, the anomaly detection algorithm may be tuned to specific use cases by tuning the parameter using training data associated with the use cases. Certain embodiments provide that the number of neighbors in each neighborhood is learned through a supervised learning process. For example, a size for each neighborhood that results in the highest accuracy with respect to the training data set may be chosen.

For each neighborhood n, a first score is calculated based on whether the value for data item i ($t_i$) exceeds the third quartile $q_3$ plus the threshold amount represented by the term k*IQR(n). A second score is calculated based on whether the value for data item i ($t_i$) is less than the first quartile $q_1$ minus the threshold amount represented by the term k*IQR(n). The second score is subtracted from the first score. If $t_i$ exceeds $q_3$ plus the threshold amount (k*IQR(n)), the score for the neighborhood will be '1.' If $t_i$ is less than $q_1$ minus the threshold amount (k*IQR(n)), the score for the neighborhood will be '−1.' Otherwise, the score for the neighborhood will be '0.'

The scores for the neighborhoods are multiplied together to create a final score. If the final score is '0,' this indicates that data item $t_i$ is not anomalous. A score of '0' may also indicate that $t_i$ is not part of a trend. For example, for the final score to be '0,' one or both of the first/second scores must also be '0.' If the first score is '0,' this may mean that $t_i$ is neither significantly larger nor significantly smaller than typical values for the left neighborhood. Similarly, if the second score is '0,' this may mean that $t_i$ is neither significantly larger nor significantly smaller than typical values for the right neighborhood. Thus, if the final score is '0,' this indicates that $t_i$ is a typical value for one or both of the neighborhoods.

If the final score is '1,' this indicates that data item $t_i$ is anomalous. For example, for the final score to be '1,' both the first and second scores must be either '1' or '−1.' If the first score is '1,' this may mean that $t_i$ is significantly larger than typical values for the left neighborhood. Similarly, if the second score is '1,' this may mean that $t_i$ is significantly larger than typical values for the right neighborhood. If the first score is '−1,' this may mean that $t_i$ is significantly smaller than typical values for the left neighborhood. Similarly, if the second score is '−1,' this may mean that $t_i$ is significantly smaller than typical values for the right neighborhood. Thus, if the final score is '1,' this indicates that $t_i$ is not a typical value for either neighborhood (e.g., $t_i$ is either larger than normal for both neighborhoods or smaller than normal for both neighborhoods).

If the final score is '−1,' this indicates that data item $t_i$ is not anomalous. A score of '−1' may also indicate that $t_i$ is part of a trend. For example, for the final score to be '−1,' one of the first and second scores must be '1,' and the other score must be '−1.' As discussed above, if the first/second score is '1,' this may mean that $t_i$ is significantly larger than typical values for the neighborhood. If the second/first score is '−1,' this may mean that $t_i$ is significantly smaller than typical values for the other neighborhood. The fact that $t_i$ is smaller than normal for one neighborhood and larger than normal for the other neighborhood indicates that $t_i$ is part of a trend (e.g., upward or downward) and not an anomaly.

When a data item in the time series data 315 is detected as anomalous, an anomaly indication 320 may be provided to a user 303 via a user interface 305. The anomaly indication 320 may alert the user 303 of the presence of the anomaly, allowing the user 303 to take remedial actions to address the anomaly.

According to some embodiments, an insight score(S) may be assigned to $t_i$ that indicates the significance of any detected anomaly or trend. The additional score may be calculated as follows:

$$S = \tanh\left(\frac{ti - \mu(n)}{\sigma(n)}\right),$$

where μ(n) represents the average for both neighborhoods and σ(n) represents the standard deviation for both neighborhoods. S may be presented to a user as part of an output indicating anomalies and trends for the time series data, or S may be used to initiate one or more remedial actions described herein. For example, in some embodiments, remedial actions may only be initiated in response to a detected anomaly if S exceeds a threshold, thereby avoiding unnecessary utilization of computing resources that would otherwise occur in connection with addressing anomalies that are relatively insignificant.

Figure 4A:
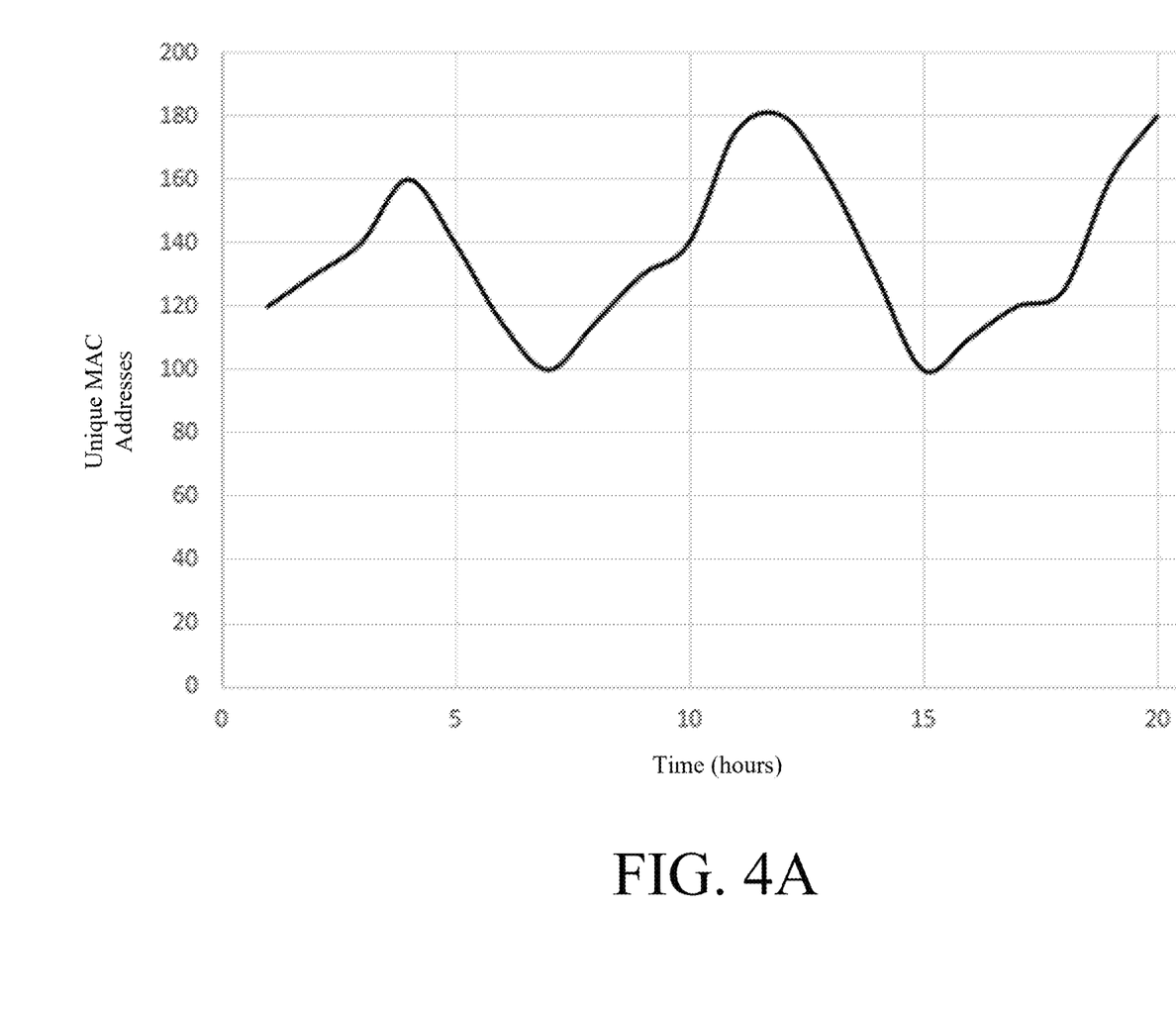
FIG. 4A depicts an example of time series data related to anomaly detection.
Figure 4B:
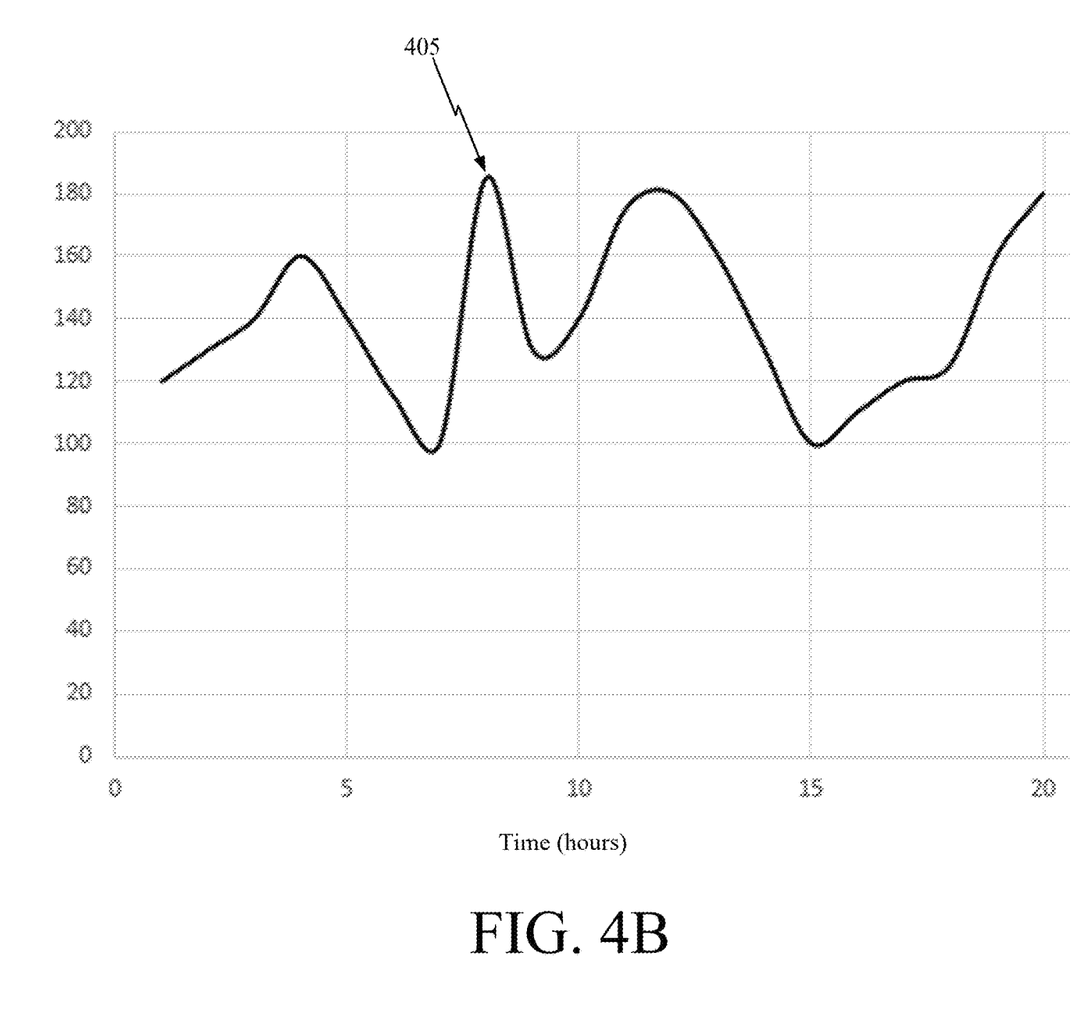
FIG. 4B depicts an additional example of time series data related to anomaly detection.

FIG. 4A depicts an example of time series data that does not contain an anomaly. FIG. 4B depicts an example of time series data that does contain an anomaly.

In FIG. 4A and FIG. 4B, values for time series data are shown with respect to time. The time series data shown in FIG. 4A and FIG. 4B represents the number of unique MAC addresses associated with packets transmitted over a network with respect to time. The number of unique MAC addresses is shown on the y-axis, and the time in hours is shown on the x-axis.

As shown in FIG. 4A, the number of unique MAC addresses peaks at around four hours, around twelve hours, and again around twenty hours. Thus, the four, twelve and twenty hour marks represent high-traffic periods where a relatively large number of unique devices are interacting with the network. The time periods around the seven and fifteen hour marks represent periods of decreased traffic.

Turning to FIG. 4B, the time series data shows a sudden spike 405 at around the eight hour mark. The spike 405 may represent unusual or malicious activity directed toward the network. The spike 405 is immediately preceded and followed by periods of decreased activity. The sudden spike 405 represents a contrast compared to the other peaks, which are much more gradual. Since the typical user behavior involves increases and decreases in activity that are much more gradual, the spike 405 may represent unusual or malicious activity directed toward the network. The anomaly detection component 105 may determine that the time series data value at the sudden spike is anomalous, and remedial actions may be taken based on the determination (e.g., blocking packets/senders, initiating security protocols such as a machine learning based malicious packet detection system, alerting users/operators of the network, and/or the like).

Example Operations Related to Anomaly Detection

Figure 5:
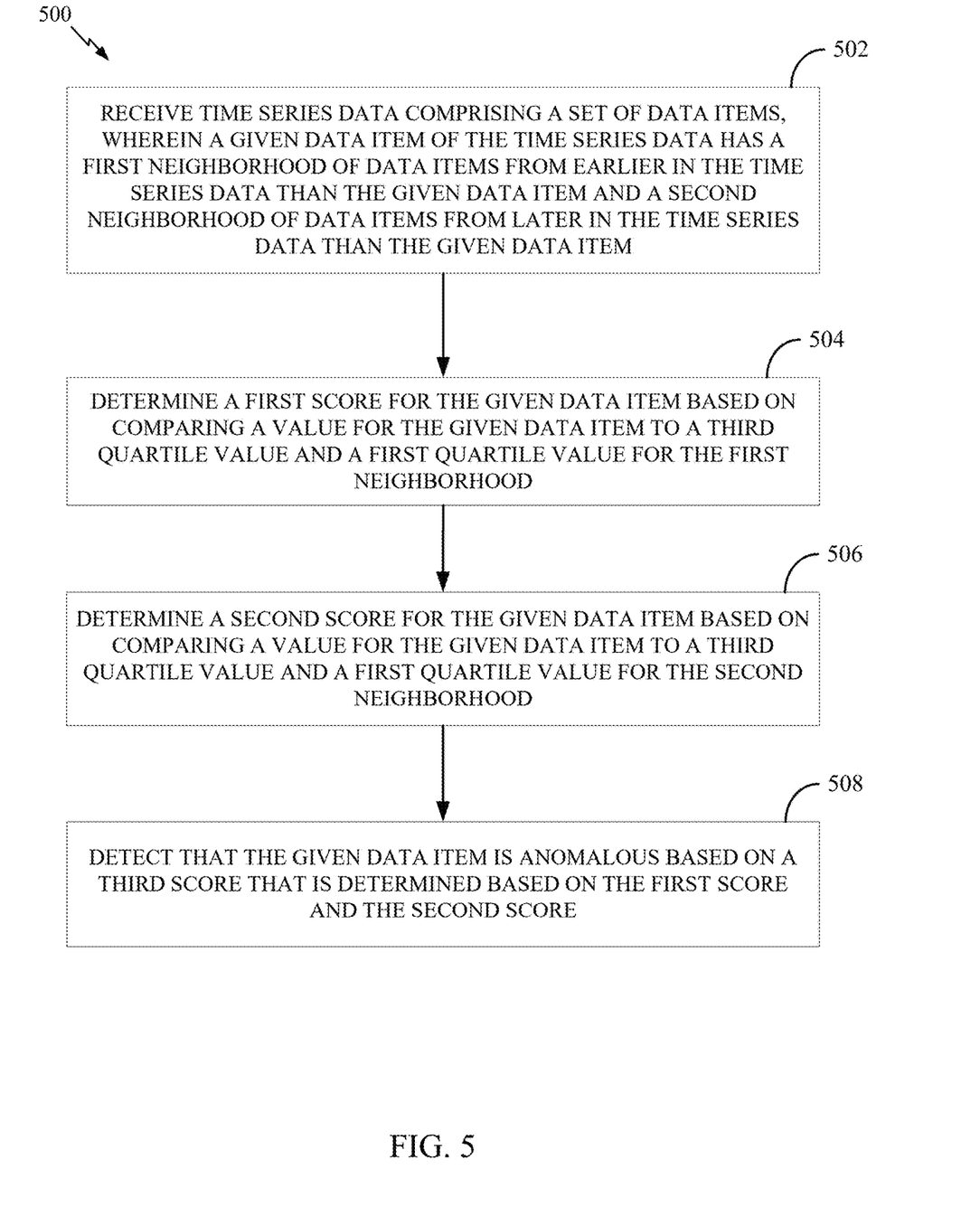
FIG. 5 depicts example operations related to anomaly detection.

FIG. 5 depicts example operations 500 related to anomaly detection. For example, operations 500 may be performed by one or more of the components described with respect to FIG. 1, FIG. 2, and FIG. 3.

Operations 500 begin at step 502 with receiving time series data comprising a set of data items, wherein a given data item of the time series data has a first neighborhood of data items from earlier in the time series data than the given data item and a second neighborhood of data items from later in the time series data than the given data item.

Operations 500 continue at step 504 with determining a first score for the given data item based on comparing a value for the given data item to a third quartile value and a first quartile value for the first neighborhood. Some embodiments provide that determining the first score for the given data item comprises determining that the value for the given data item exceeds the third quartile value for the first neighborhood by a threshold amount or determining that the first quartile value for the first neighborhood exceeds the value for the given data item by the threshold amount.

Operations 500 continue at step 506 with determining a second score for the given data item based on comparing a value for the given data item to a third quartile value and a first quartile value for the second neighborhood. In some embodiments, determining the second score for the given data item comprises determining that the value for the given data item exceeds the third quartile value for the second neighborhood by a threshold amount or determining that the first quartile value for the second neighborhood exceeds the value for the given data item by the threshold amount. According to some embodiments, based on the value for the given data item exceeding the third quartile value for the second neighborhood by the threshold amount, the second score is positive. Certain embodiments provide that the threshold amount is determined based on a supervised learning process through which a value that most accurately detects anomalies in a labeled training data set is selected as the threshold amount.

In some embodiments, determining the first score for the given data item comprises determining that the value for the given data item exceeds the third quartile value for the first neighborhood by the threshold amount; based on the value for the given data item exceeding the third quartile value for the first neighborhood by the threshold amount, the first score is positive; the third score is based on a product of the first score and the second score; and the given data item is detected as anomalous based on the third score being positive.

Operations 500 continue at step 508 with detecting that the given data item is anomalous based on a third score that is determined based on the first score and the second score.

According to some embodiments, each data item of the set of data items comprises a respective distance in an embedding space between an embedding representation of a respective input to a generative machine learning model and an embedding representation of a respective output generated by the generative machine learning model based on the respective input; and based on detecting that the given data item is anomalous, the generative machine learning model is retrained.

Certain embodiments provide that each data item of the set of data items comprises a respective distance in an embedding space between an embedding representation of a respective output generated by a generative machine learning model based on a prompt that corresponds to a particular use case and an embedding representation of a ground truth output associated with the particular use case; and based on detecting that the given data item is anomalous, the generative machine learning model is retrained.

In some embodiments, the set of data items comprises values associated with one or more network packets; and based on detecting that the given data item is anomalous, one or more network packets are blocked.

Certain embodiments provide that the set of data items comprises values indicative of performance of a computing system; and based on detecting that the given data item is anomalous, one or more remedial actions are performed with respect to the computing system.

Example of a Processing System for Anomaly Detection

Figure 6:
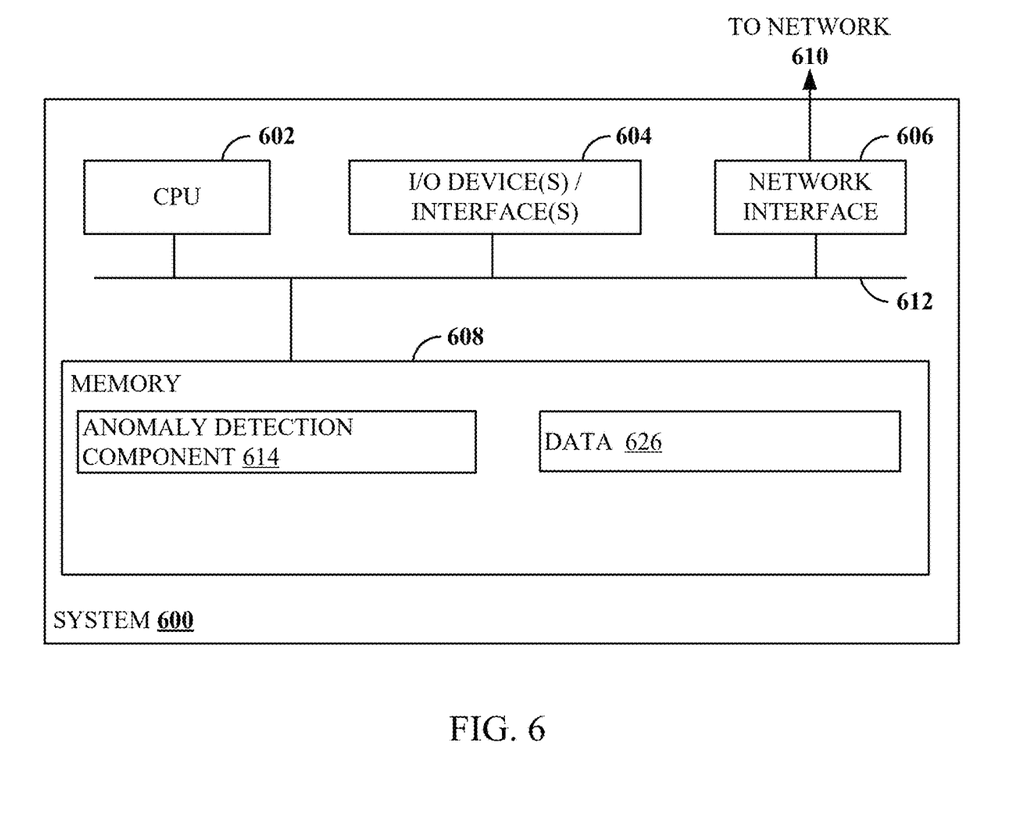
FIG. 6 depicts an example of a processing system for anomaly detection.

FIG. 6 illustrates an example system 600 with which embodiments of the present disclosure may be implemented. For example, system 600 may be configured to perform operations 500 of FIG. 5 and/or to implement one or more components as in FIG. 1, FIG. 2, and FIG. 3.

System 600 includes a central processing unit (CPU) 602, one or more I/O device interfaces that may allow for the connection of various I/O devices 604 (e.g., keyboards, displays, mouse devices, pen input, etc.) to the system 600, network interface 606, a memory 608, and an interconnect 612. It is contemplated that one or more components of system 600 may be located remotely and accessed via a network 610. It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, and memory 608. CPU 602 is included to be representative of a single CPU, multiple CPUs, a single CPU having multiple processing cores, and other arrangements.

Additionally, the memory 608 is included to be representative of a random access memory or the like. In some embodiments, memory 608 may comprise a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

As shown, memory 608 includes anomaly detection component 614, which may be representative of anomaly detection component 105 of FIG. 1, FIG. 2, and FIG. 3. Memory 608 further comprises data 626 which may correspond to time series data 315 of FIG. 3.

It is noted that in some embodiments, system 600 may interact with one or more external components, such as via network 610, in order to retrieve data and/or perform operations.

Example Computing Code for Implementing an Anomaly Detection Algorithm

FIG. 7 depicts example computing code 700 for implementing an anomaly detection algorithm according to certain embodiments.

For example, computing code 700 may implement a neighborhood-based anomaly detection algorithm such as that described above with respect to FIG. 3 and/or in other parts of the disclosure above.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system, comprising:
   one or more processors; and
   a memory comprising instructions that, when executed by the one or more processors, cause the system to:
   receive time series data comprising a set of data items, each data item of the set of data items comprising a respective distance in an embedding space between an embedding representation of a respective input provided to a generative machine learning model and an embedding representation of a respective output generated by the generative machine learning model based on the respective input, wherein a given data item of the time series data has a first neighborhood of data items from earlier in the time series data than the given data item and a second neighborhood of data items from later in the time series data than the given data item;
   determine a first score for the given data item based on comparing a value for the given data item to a third quartile value and a first quartile value for the first neighborhood;
   determine a second score for the given data item based on comparing a value for the given data item to a third quartile value and a first quartile value for the second neighborhood;
   detect that the given data item is anomalous based on a third score that is determined based on the first score and the second score; and
   retrain the generative machine learning model based on detecting that the given data item is anomalous.

2. The system of claim 1, wherein determining the first score for the given data item comprises determining that the value for the given data item exceeds the third quartile value for the first neighborhood by a threshold amount or determining that the first quartile value for the first neighborhood exceeds the value for the given data item by the threshold amount.

3. The system of claim 1, wherein determining the second score for the given data item comprises determining that the value for the given data item exceeds the third quartile value for the second neighborhood by a threshold amount or determining that the first quartile value for the second neighborhood exceeds the value for the given data item by the threshold amount.

4. The system of claim 3, wherein, based on the value for the given data item exceeding the third quartile value for the second neighborhood by the threshold amount, the second score is positive.

5. The system of claim 4, wherein:
   determining the first score for the given data item comprises determining that the value for the given data item exceeds the third quartile value for the first neighborhood by the threshold amount;
   based on the value for the given data item exceeding the third quartile value for the first neighborhood by the threshold amount, the first score is positive;
   the third score is based on a product of the first score and the second score; and
   the given data item is detected as anomalous based on the third score being positive.

6. A method, comprising:
   receiving time series data comprising a set of data items, each data item of the set of data items comprising a respective distance in an embedding space between an embedding representation of a respective generative machine learning model output that corresponds to a use case and an embedding representation of a ground truth output that corresponds to the use case, wherein a given data item of the time series data has a first neighborhood of data items from earlier in the time series data than the given data item and a second neighborhood of data items from later in the time series data than the given data item;
   determining a first score for the given data item based on comparing a value for the given data item to a third quartile value and a first quartile value for the first neighborhood;
   determining a second score for the given data item based on comparing a value for the given data item to a third quartile value and a first quartile value for the second neighborhood;
   detecting that the given data item is anomalous based on a third score that is determined based on the first score and the second score; and
   retraining the generative machine learning model based on detecting that the given data item is anomalous.

7. The method of claim 6, wherein determining the first score for the given data item comprises determining that the value for the given data item exceeds the third quartile value for the first neighborhood by a threshold amount or determining that the first quartile value for the first neighborhood exceeds the value for the given data item by the threshold amount.

8. The method of claim 6, wherein determining the second score for the given data item comprises determining that the value for the given data item exceeds the third quartile value for the second neighborhood by a threshold amount or determining that the first quartile value for the second neighborhood exceeds the value for the given data item by the threshold amount.

9. The method of claim 8, wherein, based on the value for the given data item exceeding the third quartile value for the second neighborhood by the threshold amount, the second score is positive.

10. The method of claim 9, wherein:
   determining the first score for the given data item comprises determining that the value for the given data item exceeds the third quartile value for the first neighborhood by the threshold amount;
   based on the value for the given data item exceeding the third quartile value for the first neighborhood by the threshold amount, the first score is positive;
   the third score is based on a product of the first score and the second score; and
   the given data item is detected as anomalous based on the third score being positive.

11. The method of claim 10, wherein the threshold amount is determined based on a supervised learning process through which a value that most accurately detects anomalies in a labeled training data set is selected as the threshold amount.

12. A method, comprising:
   receiving time series data comprising a set of data items, each data item of the set of data items comprising performance data associated with a computing system, wherein a given data item of the time series data has a first neighborhood of data items from earlier in the time series data than the given data item and a second neighborhood of data items from later in the time series data than the given data item;
   determining a first score for the given data item based on comparing a value for the given data item to a third quartile value and a first quartile value for the first neighborhood;
   determining a second score for the given data item based on comparing a value for the given data item to a third quartile value and a first quartile value for the second neighborhood;
   detecting that the given data item is anomalous based on a third score that is determined based on the first score and the second score; and
   performing a remedial action with respect to the computing system based on detecting that the given data item is anomalous.

13. The method of claim 12, wherein determining the first score for the given data item comprises determining that the value for the given data item exceeds the third quartile value for the first neighborhood by a threshold amount or determining that the first quartile value for the first neighborhood exceeds the value for the given data item by the threshold amount.

14. The method of claim 12, wherein determining the second score for the given data item comprises determining that the value for the given data item exceeds the third quartile value for the second neighborhood by a threshold amount or determining that the first quartile value for the second neighborhood exceeds the value for the given data item by the threshold amount.

15. The method of claim 14, wherein, based on the value for the given data item exceeding the third quartile value for the second neighborhood by the threshold amount, the second score is positive.

16. The method of claim 15, wherein:
   determining the first score for the given data item comprises determining that the value for the given data item exceeds the third quartile value for the first neighborhood by the threshold amount;
   based on the value for the given data item exceeding the third quartile value for the first neighborhood by the threshold amount, the first score is positive;
   the third score is based on a product of the first score and the second score; and
   the given data item is detected as anomalous based on the third score being positive.

17. The method of claim 16, wherein the threshold amount is determined based on a supervised learning process through which a value that most accurately detects anomalies in a labeled training data set is selected as the threshold amount.

18. A method, comprising:
   receiving time series data comprising a set of data items, each data item of the set of data items comprising data associated with a respective network packet, wherein a given data item of the time series data has a first neighborhood of data items from earlier in the time series data than the given data item and a second neighborhood of data items from later in the time series data than the given data item;
   determining a first score for the given data item based on comparing a value for the given data item to a third quartile value and a first quartile value for the first neighborhood;
   determining a second score for the given data item based on comparing a value for the given data item to a third quartile value and a first quartile value for the second neighborhood;
   detecting that the given data item is anomalous based on a third score that is determined based on the first score and the second score; and
   blocking one or more network packets based on detecting that the given data item is anomalous.

19. The method of claim 18, wherein determining the first score for the given data item comprises determining that the value for the given data item exceeds the third quartile value for the first neighborhood by a threshold amount or determining that the first quartile value for the first neighborhood exceeds the value for the given data item by the threshold amount.

20. The method of claim 18, wherein determining the second score for the given data item comprises determining that the value for the given data item exceeds the third quartile value for the second neighborhood by a threshold amount or determining that the first quartile value for the second neighborhood exceeds the value for the given data item by the threshold amount.

* * * * *